United States Patent [19]

Raju

[11] Patent Number: 4,832,155

[45] Date of Patent: May 23, 1989

[54] POWER TRANSMISSION DEVICE

[76] Inventor: Kothapalli V. S. T. Raju, 8-3-224/9, Madhuranagar, Hyderabad 500 045, Andhra Pradesh, India

[21] Appl. No.: 92,208

[22] Filed: Sep. 2, 1987

[51] Int. Cl.$^4$ .............................................. F03G 7/08
[52] U.S. Cl. ........................................ 185/30; 185/39; 185/43
[58] Field of Search .................. 185/10, 13, 29, 30, 185/39, 43

[56] References Cited

U.S. PATENT DOCUMENTS

| | | | |
|---|---|---|---|
| 418,590 | 12/1889 | Ringen | 185/30 |
| 672,089 | 4/1901 | Brittain | 185/39 |
| 824,102 | 6/1906 | Driver et al. | 185/39 |
| 1,332,870 | 3/1920 | Gill | 185/29 |
| 1,371,719 | 3/1921 | Alber | 185/43 |
| 1,667,152 | 4/1928 | Hegge | 185/30 |
| 3,250,140 | 5/1966 | Russell | 185/29 X |

Primary Examiner—Allan D. Herrmann
Attorney, Agent, or Firm—Grimes & Battersby

[57] ABSTRACT

A power transmission device comprising a rotatably mounted drum for housing a spring mechanism, one end of the spring mechanism being fixed to the interior of the drum, and the other end of the spring mechanism being fixed to a sprocket gear wheels provided on the drum axis. There is also provided a slip clutch adapted to engage the second sprocket gear wheel, a freewheel, connected to the slip clutch, a drive wheel coupled to the freewheel, at least one crank coupled by a drive to the drive wheel for rotating the drive wheel, and a speed control governor coupled to the drum. Cranking of the drive wheel drives the freewheel and then the slip clutch and sprocket gear wheel to wind the spring mechanism, causing the drum to rotate under spring-tension at a speed regulated by the governor so as to provide mechanical power.

3 Claims, 10 Drawing Sheets

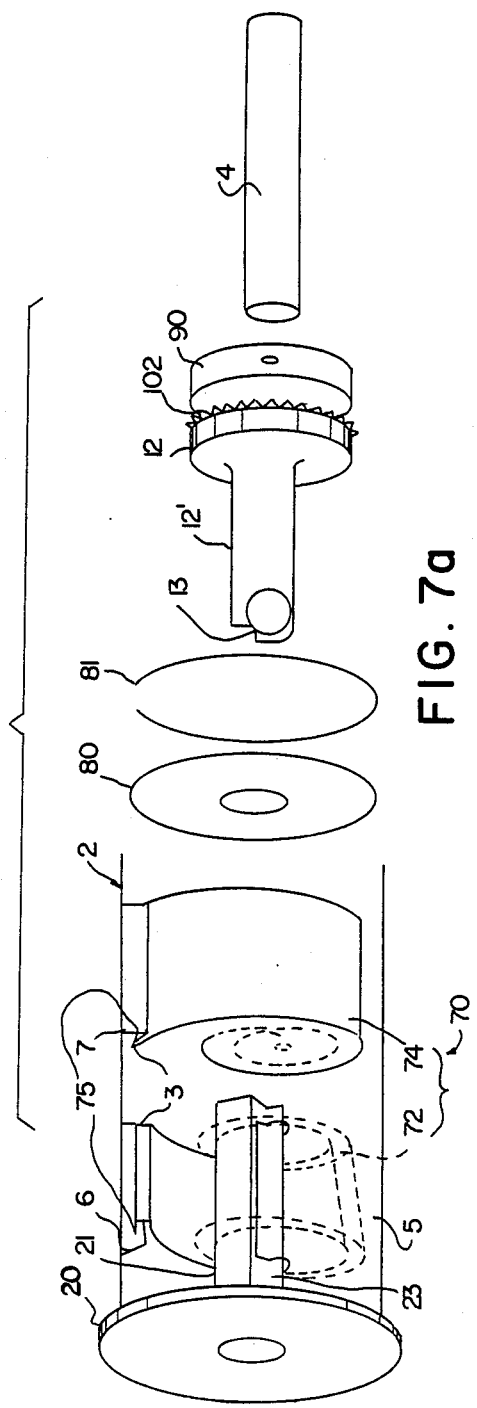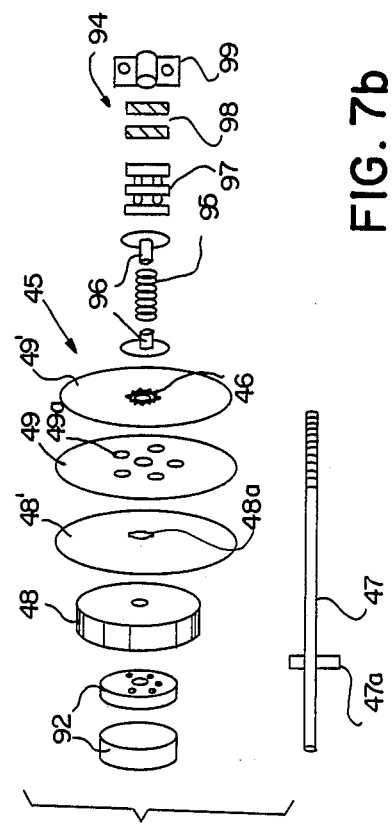

POWER TRANSMISSION DEVICE

BACKGROUND OF THE INVENTION

1. Field of the Invention

This invention relates to a power of transmission device and, more particularly, to a power transmission device which is capable of continuously providing energy.

2. Description of the Prior Art

Due to the ever increasing demand for energy, there is a concern that some of our material sources of energy, such as coal, wood, oil and kerosene will be depleted. Accordingly, efforts have been directed to producing alternative forms of energy. Some such forms of energy, such as nuclear energy, are expensive and complicated to run and maintain.

The device of the present invention is a simple solution to an appreciable part, though not the whole, of the energy crisis which is ravaging the world. Specifically, the need for power is met by this invention in a way practical for the common man, and without dependence on the use of coal, wood kerosen or other fast depleting sources of energy.

SUMMARY OF THE INVENTION

An object of the present invention is to provide a device which is capable of storing energy that has been supplied to it, either by tidal forces or manually, for use whenever energy is desired.

Another object of the present invention is to provide a mechanical device which is capable of continuously supplying energy while only storing energy therein from time to time.

A further object of the present invention is to provide a power transmission device which continuously supplies energy continuously months at a time, yet needs little maintenance and in the unlikely event that any component thereof fails or malfunctions, repairs are relatively easy and can be carried out by any person having a rudimentary knowledge of mechanics.

A still further object of this invention is to provide a device which can be used both in domestic and industrial spheres, such as in a dwelling house for generating and for supplying electric power to one or more rooms thereof or equally well in an industrial facility for the same purpose.

A yet further object of the present invention is to provide such a device which is eminently suited for use not only in the metropolis, but also in small towns and even villages, since it is easily and readily operable by even an unskilled person.

A still yet further object of the present invention is to provide such a device a which can utilize tidal energy forces for lighting, heating, refrigerating and other energy purposes should the house or factory to be energized be situated near sea-shores round the globe.

A still further object of the present invention is to provide a device which transmits a basic energy output and can either use the basic energy output or convert same to electric or other forms of energy.

A yet still further object of the present invention is to provide such a device that also can be put into operation by a crank which can also be manually actuated by hand or foot.

A yet still further object of the present invention is to provide such a device which uses certain specific mechanical mechanisms for coupling a crank to a drive wheel in order to render the transmission of power from the crank to the drive wheel effective and efficient.

These and other objects of the present invention are provided by a power transmission device comprising a rotatably mounted drum for housing a spring system, one end of the spring system being fixed to the interior of the drum, and the other end of the spring system being fixed to the pipes of first sprocket gear wheel and second sprocket gear wheel provided on the drum axis. There is also provided a slip clutch adapted to engage the second sprocket gear wheel, a freewheel connected to the slip clutch, a drive wheel coupled to the freewheel, at least one crank coupled to a drive wheel for rotating the drive wheel, and a speed control governor coupled to the drum, whereby cranking of the drive wheel drives the freewheel and the clutch and second sprocket gear wheel to wind the spring system, thus causing the drum to rotate under spring-tension at a speed regulated by the governor to provide mechanical power.

BRIEF DESCRIPTION OF THE DRAWINGS

This invention will now be described with reference to the accompanying drawings which illustrate by way of example possible embodiments thereof wherein:

FIG. 7 consists of FIGS. 7A and 7B with FIG. 7A being an exploded segmented view of the spring system of the present invention, and FIG. 7B being an exploded segmented view of its connection to the device of FIG. 1.

DESCRIPTION OF THE PREFERRED EMBODIMENTS

Figure 1:
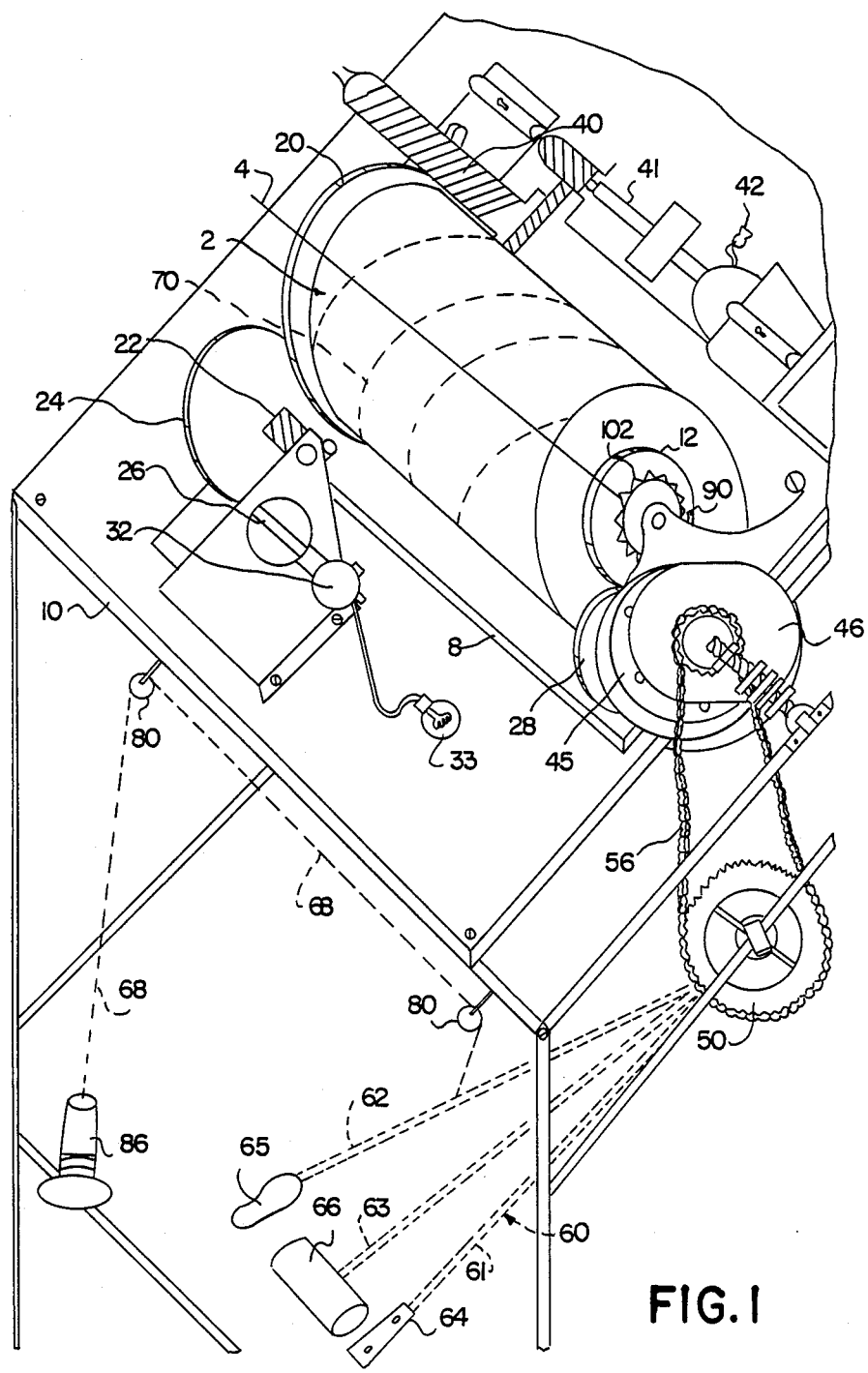
FIG. 1 is a schematic perspective view of the device of the present invention.

Referring to the drawings and in particular to FIG. 1, there is provided a rotatably mounted drum generally represented by reference numeral 2 mounted on chassis 8 which in turn is mounted on frame 10. The drum houses a coiled spring system 70 comprising at least two springs 72 and 74 (shown in FIGS. 7 and 8).

In the embodiment of FIG. 1, the drum 2 is connected by conventional means to a first gear wheel 20 and both are located on a common shaft or center axis 4. First gear wheel 20 may be either riveted or independent of drum 2. In the embodiment of FIG. 1, the teeth of first gear wheel 20 mesh with a pinion 22. A common shaft (not shown) is provided to operatively connect pinion 22 to the second gear wheel 24 at their center points. The teeth of the second gear wheel 24 engage the teeth of dynamo or generator shaft 26 and toothed shaft 26 in turn, engages dynamo 32. Dynamo 32 then by conventional means generates electric power to light a light source, such a light bulb 33.

Also in this embodiment, the drum 2, via first gear wheel 20 which engages a worm gear 40, is connected to a conventional speed control governor 41 which regulates in a known manner the speed of the rotating drum 2.

A drive wheel 50 is located on frame 10 and is parallel but axially offset with respect to the center axis 4 of the drum 2. The drive wheel 50 is rotated by operating a crank mechanism 60. First chain 56 connects drive wheel 50 to freewheel 46 so that the rotation of drive wheel 50, rotates the freewheel 46. Freewheel 46 is connected to a clutch mechanism 45 by conventional means so that rotation of freewheel 46 causes clutch mechanism 45 to rotate in the same direction and at the same speed. The clutch mechanism 45, in turn by conventional means, drives a third gear wheel chassis 28 whose teeth engage the teeth of second gear wheel 12 located on central axis to rotate it and thus wind the spring system 70. The spring system, thus wound, drives the drum 2 and first gear wheel 20 to provide mechanical power thereat, which can be utilized for purposes including the generation of electric power.

Significantly, once the spring system 70 is fully wound, any further rotation imparted to the clutch mechanism 45 is not transmitted to the third gear wheel 28 and second gear wheel 12 because the resistance offered by the wound spring system 70 causes the clutch mechanism 45 to slip. Thus, the clutch mechanism of the present invention is rendered operative only when the spring system 70 is partially or fully unwound. Ratchet wheel 102 is also provided on central shaft 4 and is fixedly connected to second gear wheel 12. While the springs in drum 2 are in tension the reverse movement of drum 2 and springs are prevented by catcher 90 provided on chassis catching ratchet wheel 102 and thereby preventing reverse movement of ratchet wheel 102, second gear wheel 12 and drum 2.

To keep the drum 2 rotating so as to provide mechanical power, it is not necessary to operate the crank system 60 continuously. The purpose of the crank 60 is served if sufficient energy is stored within the spring system from time to time so as to enable the spring to release such energy to the drum 2 or first gear wheel 20 whenever required.

The speed-control governor 41 regulates the angular speed of the drum 2. The governor 41 is mainly intended to ensure that the drum 2 does not rotate at what may be called a "runaway" speed. The governor 41 also ensures that any device coupled to the drum 2 (such as the generator or dynamo 32) is driven at the rated speed of such device.

In the embodiment illustrated in FIG. 1, there is provided a crank system 60 which may include three cranks, 61, 62 and 63, each for a different type of application. The cranks are directly connected to drive wheel 50.

A first crank 61 may be provided with a handle 64 for operating the crank by pumping the handle up and down by hand.

A second crank 62 may have a pedal 65 for operating the crank by foot, and is connected by a second cord or chain 68 to a weight 86. The second cord or chain 68 runs through pulleys 80 connected to frame 10. The purpose of the cord or chain 68 and weight 86 is to facilitate the return or upward movement of the crank 62.

The third crank 63 has a vane or float 66. The float 66 is positioned in the sea. The float 66 bounces or is actuated to-and-fro by the wave or tidal forces on the various bodies of water. The to-and-fro action of float 66 activates the crank 63 so as to crank the drive wheel 50.

The embodiments of FIGS. 2 through 6 show different specific crank mechanisms. The reference letters of these figures refer to the same elements in FIG. 1 unless indicated otherwise.

Figure 2:
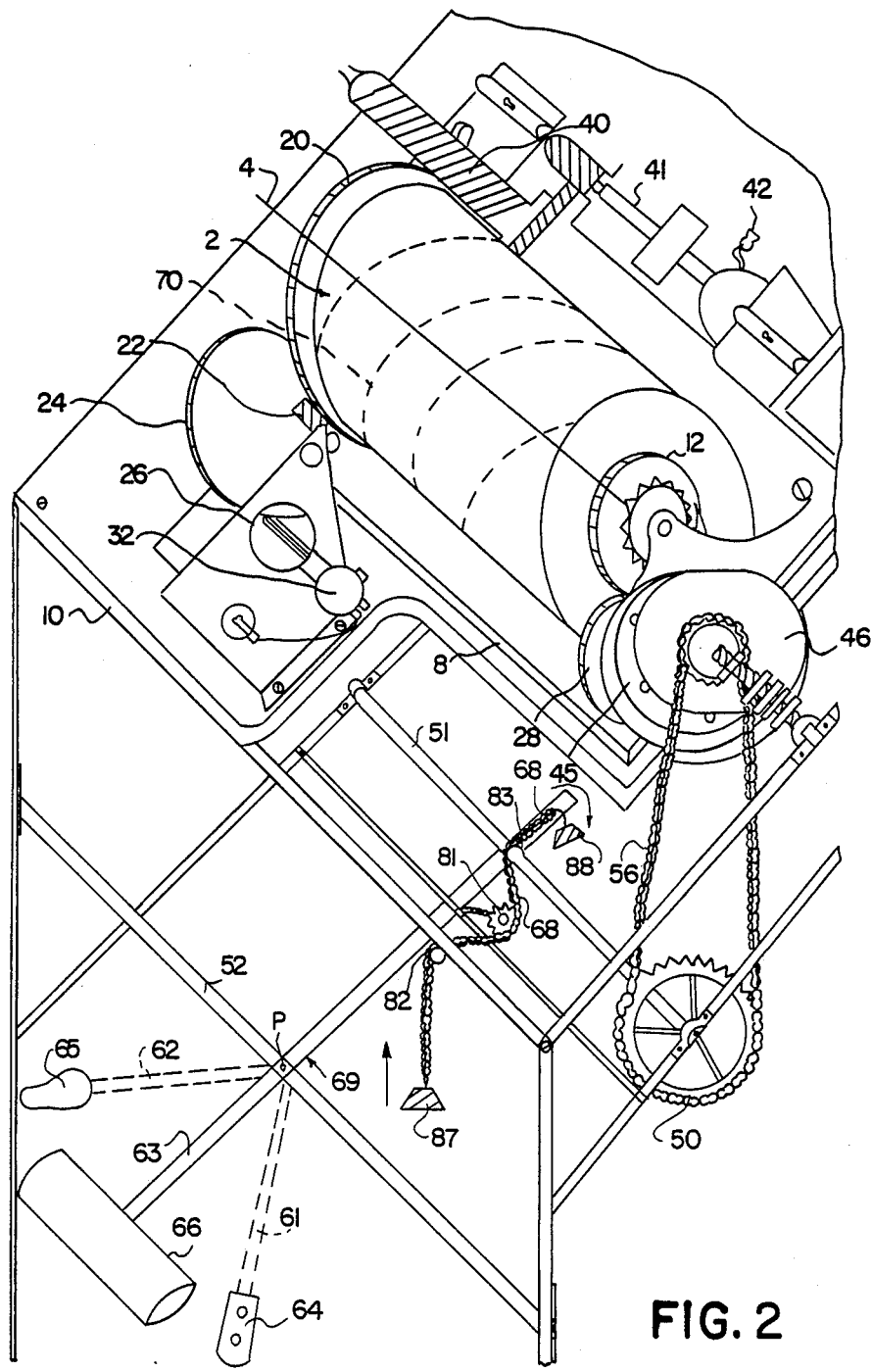
FIG. 2 is an embodiment of the device of FIG. 1 in which a chain and freewheel drive is provided.

In the embodiment illustrated in FIG. 2, there is also provided a first crank 61 with a handle 64 for operating the crank by hand, a second crank 62 with a pedal 65 for operating the crank by foot, and a third crank 63 with a vane or float 66 which can be disposed in the sea so as to be actuated to-and-fro by the wave or tidal forces and thereby crank the driver wheel 50.

In this embodiment, each crank 61, 62 and 63 is constructed so as to form part of a shaft 69 which is pivoted at point P. At the free end of the shaft 69, one end of a second chain 68 is fixed. The second chain 68 runs over a second freewheel 83, which is fixed to the center shaft or axis 51 of the drive wheel 50. Second chain 68, also passes over idler rollers 81 and 82 and is tensioned at one end by a weight 87. When any one of the cranks 61, 62, 63 is actuated, shaft 69 causes second freewheel 83 to rotate to drive or rotate axis 51. Since axis 51 is connected to drive wheel 50, and wheel 50 is thus also rotated. The shaft 69 is, preferably, weighted at 88 to keep it freely balanced.

Figure 3:
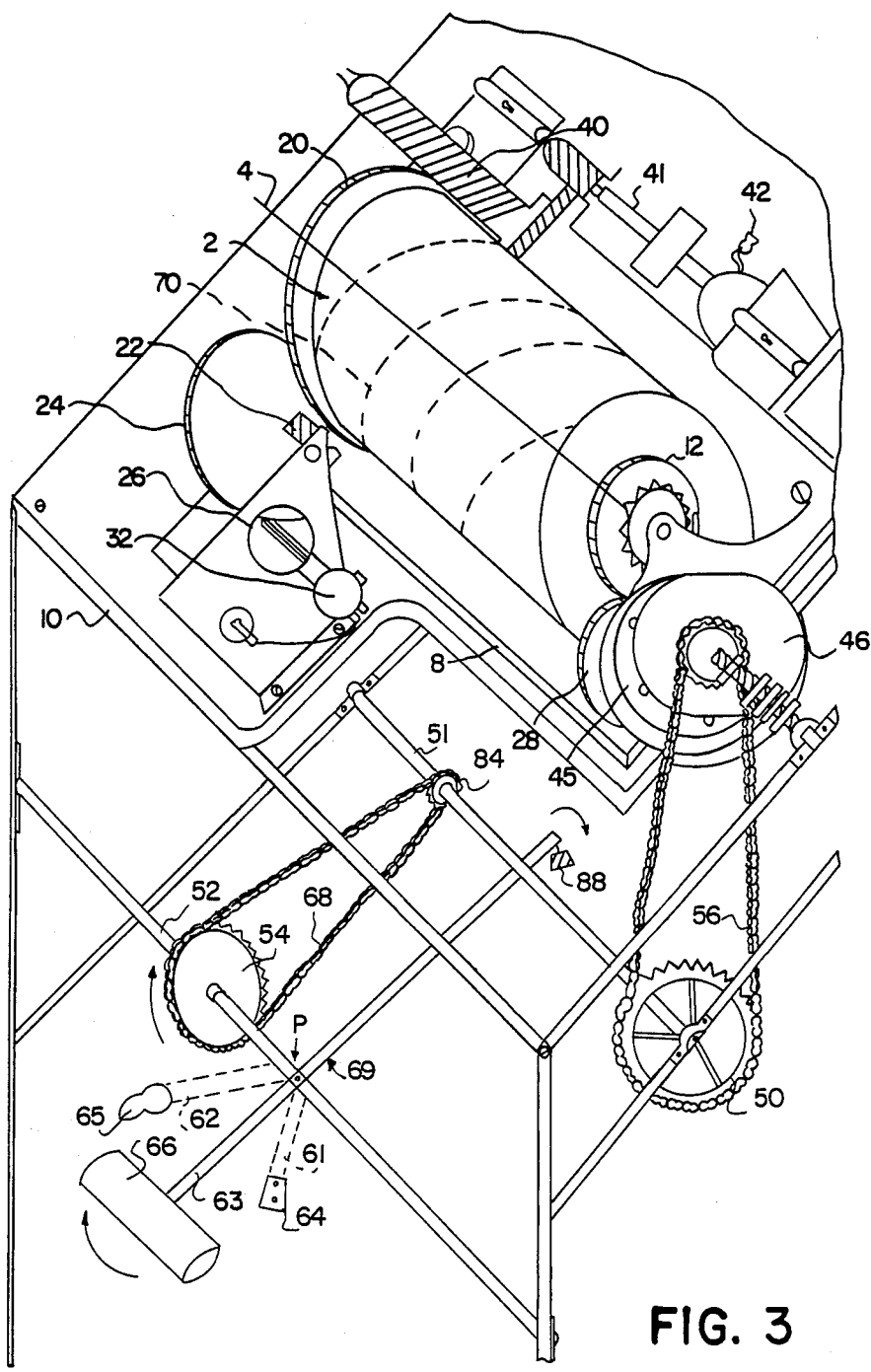
FIG. 3 is an embodiment of the device of FIG. 1 in which an alternative chain and freewheel drive is provided.

In the embodiment illustrated in FIG. 3, the cranks 61, 62, 63 form a part of a shaft 69 which is pivoted at point P. The free end of the shaft 69 is weighted 88 for keeping it freely balanced. However, the pivot point P is located on an axis or axle 52 which is substantially parallel to axis or axle 51 of drive wheel 50, and is connected to axle 51 by second chain 68. Specifically, a chain wheel 54 is provided on axle 52 and a second free wheel 84 is provided on axle 51, and chain wheel 54 and second free wheel 84 are operatively connected by second chain 68. When any one of the cranks 61, 62, 63 are actuated, the axle 52 is rotated and drives the chain wheel 54 which in turn causes the second free wheel 84 and axle 51 to be driven, thereby driving the drive wheel 50.

Figure 4:
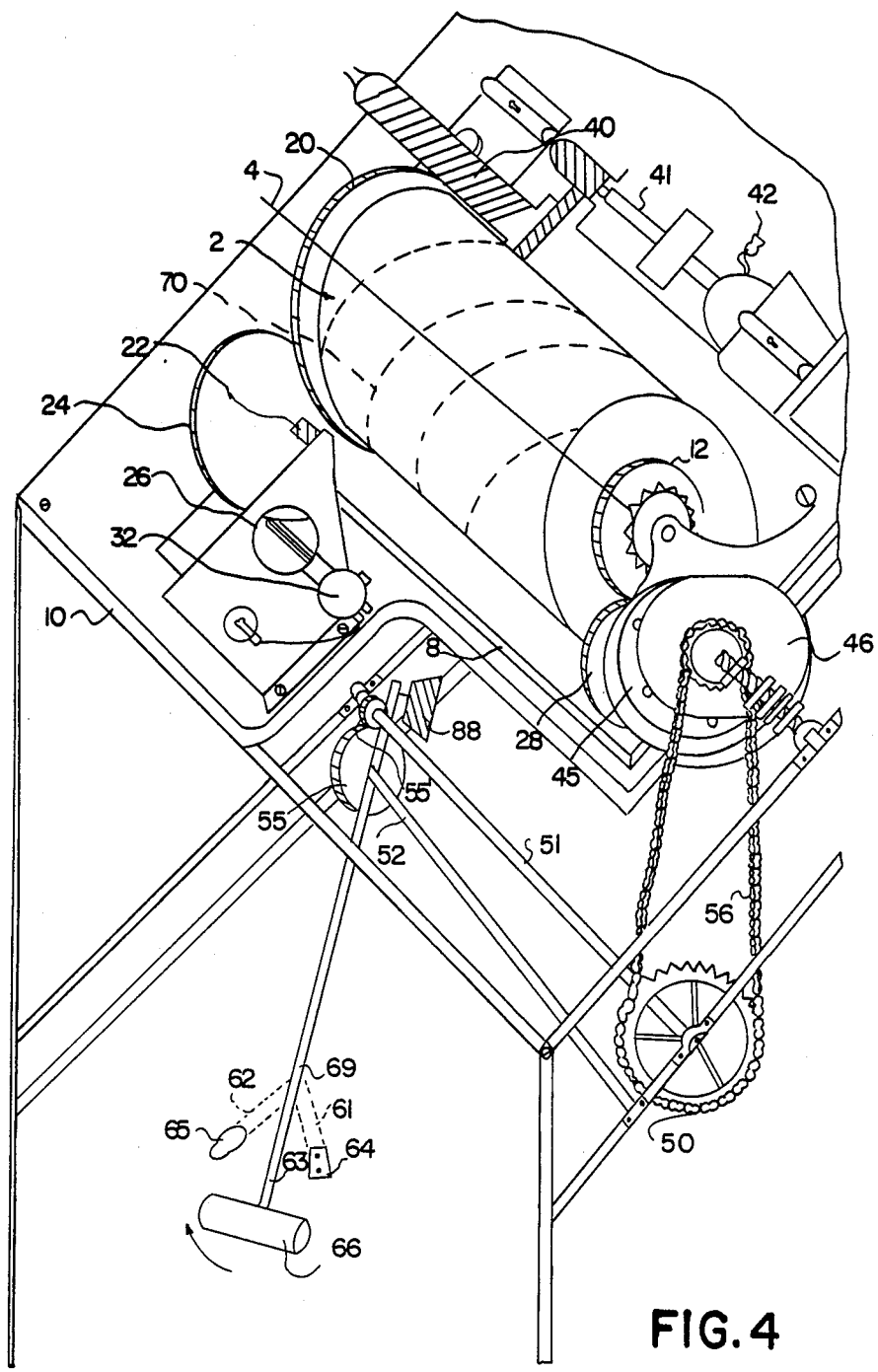
FIG. 4 is an embodiment of the device of FIG. 1 in which a gear drive is provided.

In the embodiment illustrated in FIG. 4, the cranks 61, 62, 63 form a part of a shaft 69 the free end of which is weighted 88 for keeping it freely balanced. The shaft 69 is connected by intermeshing gear 55 on axle 52 to gear 55' on axle 51. Actuation of any one of the cranks 61, 62, 63 causes the shaft 69 to drive or rotate the gear 55 and thus gear 55' which in turn drives or rotates axle 51 to rotate the driver wheel 50.

Figure 5:
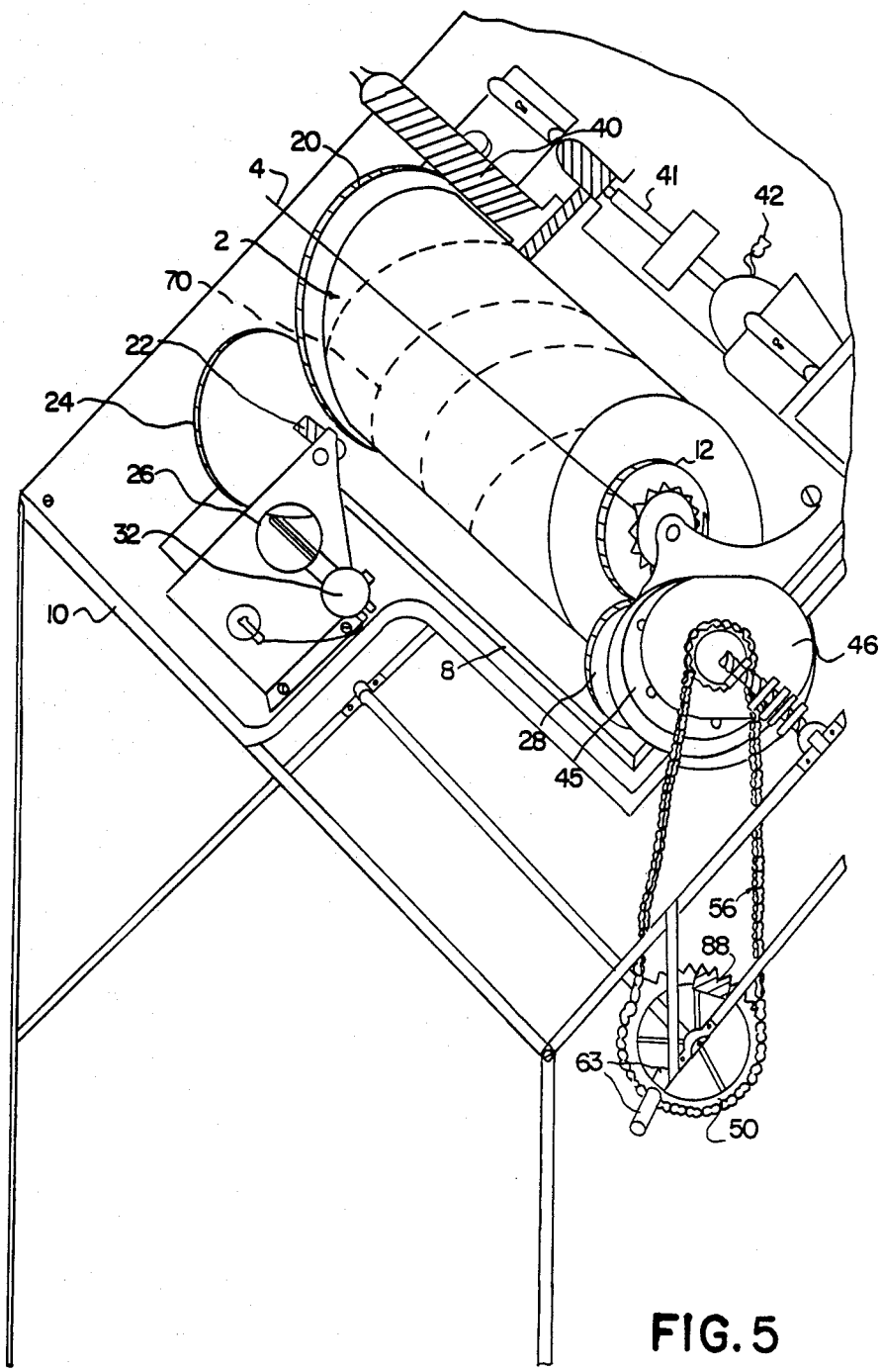
FIG. 5 is an embodiment of the device of FIG. 1 in which a direct crank drive is provided.

In the embodiment illustrated in FIG. 5, crank 63 itself is the float or other buoyant member. Crank 63 is directly connected to the drive wheel 50 and extends on both sides of the drive wheel as shown in FIG. 5. As the crank 63 is actuated by wave or tidal forces, it drives the drive wheel 50. Opposite crank 63 on wheel 50 there is provided weight 88 for balancing the crank 63 or float 63.

Figure 6:
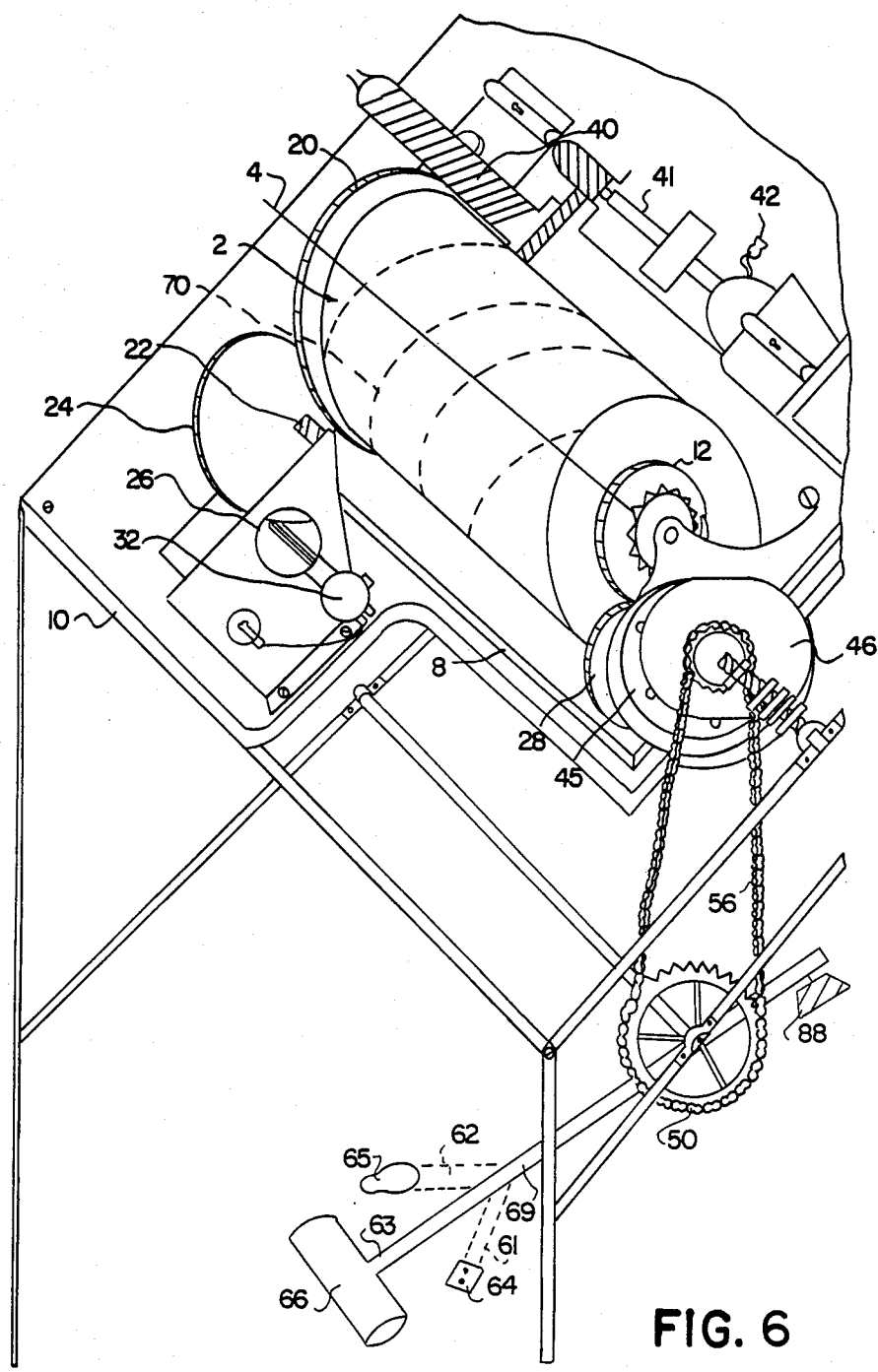
FIG. 6 is an embodiment of the device of FIG. 1 in which a weighted pivoted drive is provided.

In the embodiment illustrated in FIG. 6, the cranks 61, 62, 63 form part of a shaft 69 which is pivoted at the hub of the drive wheel 50. The free end of the shaft 69 is weighted 88 to freely balance same. Consequently when one of the cranks 61, 62, 63 is actuated, the drive wheel 50 is driven or rotated by the shaft 69.

Figure 8:
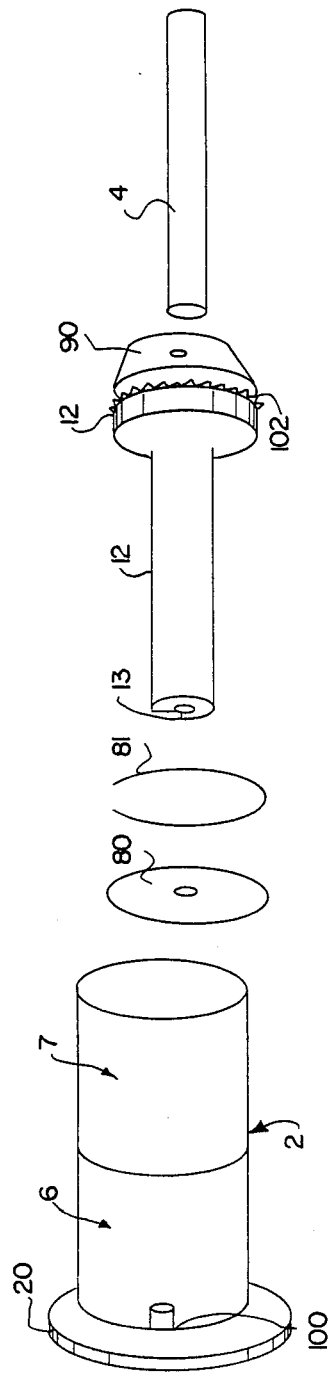
FIG. 8 is an exploded schematic view of an alternative spring system and its connection in the device of FIG. 1.
Figure 9:
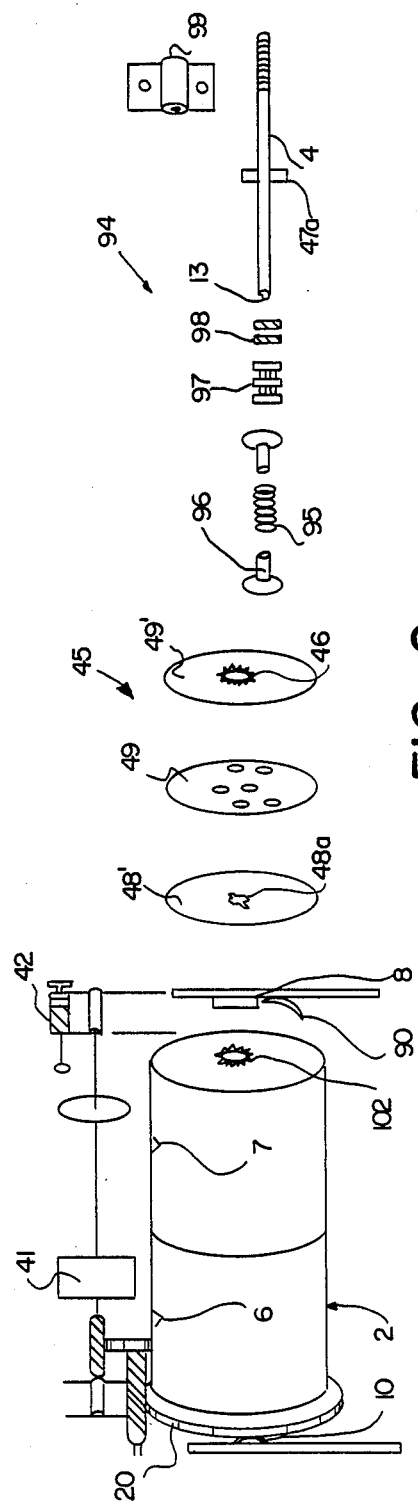
FIG. 9 is an exploded schematic view of another alternative spring system and its connection in the device of FIG. 1.

FIGS. 7 to 9 illustrates several alternative embodiments of the spring system of the present invention.

As shown in FIG. 7A, spring system 70 has a pair of coiled springs 72 and 74. Basically, the first or one end 75 of the springs 72 and 74 are connected to the interior 5 of the drum 2 at position 3. The other end of spring 72 is connected to a slot 23 of pipe 21 of first gear wheel 20, and the other end of spring 74 is connected to a slot 13 of pipe 12' of ratchet wheel 102 and sprocket gear wheel 12. Pipes 12' and 21 are revolve on the center axis 4 of the drum 2. Whenever the ratchet wheel 102 and sprocket gear wheel 12 are rotated, the spring system 70 is wound, and the wound springs 72 and 74 rotatably drive the drum 2 to provide mechanical power thereat.

The interior 5 of drum 2 has a pair of hook wall portions or hooks 6 and 7. Each first end 75 of springs 72 and 74 are connected to a diffeerent one of the hooks 6 and 7.

Coiled spring 72 has an end connected to slot 23 of pipe 21 of wheel 20 and has first end 75 located in and engaged to hook 6. Coiled spring 74 has first end 75 located in and engaged to hook 7 and has the other end in slot 13 of pipe of ratchet wheel 102 and sprocket gear wheel 12. Drum 2 also has a cover 80 which protects springs 72, 74 in the drum. Cover 80 is retained or locked on the end of the drum 2 by conventional means, such as retaining ring 81.

First gear wheel 20, drum 2, ratchet wheel 102 and sprocket gear wheel 12 are located on the common center axis or axle 4. First gear wheel 20, and ratchet wheel 102 with sprocket gear wheel 12 revolve on axis 4 independent of each other and in opposite directions with respect to each other. Specifically, coil springs 72 and 74 wind tight in opposite directions with respect to each other. As ratchet wheel 102 and sprocket gear wheel 12 are rotated (through freewheel 46, clutch mechanism 45 and third gear wheel 28) by the drive wheel 50, wheel 12 acts to tighten spring 74 thereby causing drum 2 to rotate. As drum 2 rotates it tightens spring 72 causing first gear wheel 20 to rotate in the direction opposite wheel 12. Worm gear 40 and governor 41 prevent spring 72 from "runaway" speed and catcher 90 located on chassis 8 prevents spring 74 from rotating in the reverse direction by catching ratchet wheel 102. As shown in this embodiment, the hooks 6, 7 are positioned pointed in opposite directions along the same plane since their respective springs 72, 74 rotate in a direction opposite to each other in order to tighten.

As shown in FIG. 7B, clutch mechanism 45 is located on axis or axle 47 which has pin or box 47a and positioned substantially paralel to axis 4 and it's one end fixed to third gear wheel 28 located on chassis 8 and the other end to the bearing in pedestal 99 on frame 10. On axle 47 gear 28 is adapted to engage second gear wheel 12. Adjacent gear 28 on axle 47 is a circle plate or washer 48' with a slot on its center hole 48a. Adjacent washer 48, is plate 49'and adjacent plate 49 is plate 49, which has a freewheel 46 connected to it.

Washer 48' rotates is concert with the rotation of gear 28. Plate 49 has a plurality of grooves or holes 49a each having elastic type material therein. Plate 48' rotates in concert with plate 49. Grooves 49a on plate 49 rub against the adjacent face or washer 48' and may either grip the washer or may slip on the face of the washer depending on whether springs 72, 74 are partially or completely tightened. As soon as springs 72, 74 in drum 2 become tight, the round plates 49, 49' slip together on washer 48'. Washer 48 stagnate due to locking of axle's pin or lock 47a with slot 48a. Washer 48 rotates along with gear 28, when springs 72, 74, are not complete tight.

Gear 28, washer 48' and plates 49, 49' each have a center hole adapted to fit in alignment on axle 47. Axle 47 is connected to chassis 8 at point by a bearing and cap 92 located at one end of the axle and by a spring-bushing mechanism 94. Spring-bushing mechanism 94 includes a spring 95 between a pair of bushings 96, thrust bearing 97 and at least one nut 98. Nut 98 acts to tighten the elements on axle 47 as tight as desired. The other end of axle 47 is fixed to the bearing in pedestal 99 on chassis 10.

In the embodiment of FIG. 8, unlike the embodiment of FIG. 7, first gear wheel 20 is permanently connected by conventional means such as by rivets, to drum 2.

Figure 10A:
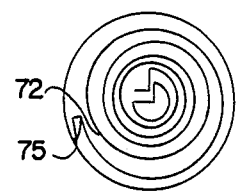
FIG. 10 consists of FIGS. 10A and 10B which are end views of the springs of the spring system shown in FIG. 7A and used in connection with all of the FIGS. of the present invention.
Figure 10B:
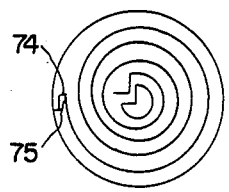

In the interior of drum 2, there is provided a bushing 100 to readily permit rotation between drum 2 and second sprocket gear wheel 12. In drum 2, there is provided hooks 6 and 7, each hook engages a different one of first end 75 of springs 72, 74 (shown in FIGS. 10A and 10B, respectively). The other end of both springs 72, 74 engages slot 13 of pipe of wheel 12. Unlike in FIG. 7a, both springs tighten by being wound in the same direction. Catcher 90, is located on chassis 8 at point identical to that shown in FIG. 7a, wheels 20 and 12 and drum 2 rotate on axle 4. In this embodiment, hooks 6, 7 are pointed in the same direction in the same plane since springs 72, 74 tighten in the same direction. Catcher 90 and ratchet wheel 102 engage each other and prevent reverse movement of second sprocket gear wheel 12 on account of spring tension in drum 2.

The slip clutch mechanism 45 and governermechanism is the same as that in FIG. 7a.

Referring to FIG. 7c, drum 2 is permanently fixed, such as by rivets, to first gear wheel 20. The speed of first gear wheel 20 is controlled by the speed control governor 41 and releaser 42 which releases the governor same or that in FIG. 7a and 7b. First end 75 (not shown) of the springs 72, 74 (not shown) are connected to hooks 6, 7 and the other end of both springs are connected on axle 4. In this embodiment, drum 2 and the slip clutch mechanism 45 are both located on same axle 4 unlike in FIG. 7a and 7b. Drum 2 is located on abutments of chassis 8 and on the opposite side of one abutment is slip clutch mechanism 45. In this embodiment, slip clutch mechanism 45 includes washer 48', and plates 49 and 49'. There is also provided a spring-bushing mechanism 94 analogous to that described in FIG. 7a and 7b. The function of catcher 90 on chassis 8 and ratchet wheel on shaft 4 ash b is the same as is shown in and described for 7a and 7b.

The terms and expressions in this specification are of description and not of limitation, there being no intention in the use of such terms and expressions of excluding any equivalents of the features illustrated and described, but it is understood that various other embodiments of the device proposed herein are possible without departing from the scope and ambit of this invention.

I claim:

1. A power transmission device comprising:
a rotatably mounted drum having a central axis;
a ratchet wheel provided on the central axis of said drum;

a gear wheel connected to said ratchet wheel, and also provided on the central axis of said drum;

a spring mechanism having with one end of said spring mechanism connected to the interior of said drum and the other end of said spring mechanism connected to at least the central axis;

a slip-clutch mechanism adapted to engage said gear wheel;

a drive wheel operatively connected to said slip-clutch mechanism;

at least one crank coupled by said drive means to said drive wheel for rotating said drive wheel;

drive means connected to said drive wheel, wherein said drive means includes a chain and a first free wheel, said chain having one end fixed to a weighted shaft provided for said crank and having the other end tensioned, and said first free wheel being mounted on a second axis, the second axis being an axis for said drive wheel; and a speed control governor coupled to said drum whereby cranking of said drive wheel drives said slip clutch mechanism and said gear wheel to wind said spring mechanism, thus causing said drum to rotate under spring-tension at a speed regulated by said governor to provide mechanical power.

2. The device as claimed in claim 1, wherein said chain is provided on a pair of idler rollers.

3. The device as claimed in claim 1, wherein said crank is connected to a weighted shaft, and wherein said drive wheel is mounted on the second axis, said drive means also including a chain wheel, said chain wheel being mounted on the central axis to which the weighted shaft provided for said crank is pivoted.

* * * * *